Sept. 2, 1947.  C. B. HARP  2,426,771
AIRPLANE MOUNTED FIRE EXTINGUISHING APPARATUS
Filed Oct. 9, 1944

INVENTOR.
CHARLES B. HARP.
BY James M. Abbett
ATTY.

Patented Sept. 2, 1947

2,426,771

UNITED STATES PATENT OFFICE 2,426,771

AIRPLANE MOUNTED FIRE EXTINGUISHING APPARATUS

Charles B. Harp, Los Angeles, Calif.

Application October 9, 1944, Serial No. 557,874

3 Claims. (Cl. 244—136)

This invention relates to fire fighting equipment, and particularly pertains to a method and means of controlling and extinguishing fires.

When large conflagrations are started it often occurs that they are of such a character or are spread over terrain which makes them inaccessible to the usual fire fighting equipment. This is particularly true in connection with forest fires which burn over the sides of mountains and into the intermediate valleys where trails and roads do not exist or are not in condition to allow fire fighting equipment to be transported conveniently. In such instances the most effective common practice of combatting such conflagrations is to backfire. This involves the burning of an additional amount of desirable ground covering and timber which could be saved if fire fighting equipment was available for a convenient operation. It is the principal object of the present invention, therefore, to provide a method and means of fighting fires which can be used independently of roads and trails and which makes it possible for the source of a conflagration to be reached in a relatively short period of time as compared to the time required to drive trucks and other equipment to the scene of the fire.

The present invention contemplates the direct application of a liquid or gaseous agent for extinguishing a fire, and which agent is spread over the area of conflagration from an airplane as it travels over the area.

The invention is illustrated by way of example in the accompanying drawings in which.

Figure 1:
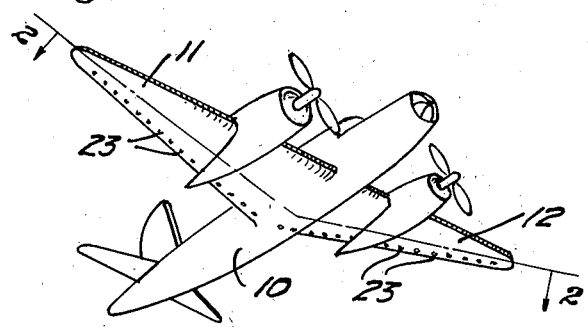
Figure 1 is a view in perspective showing an airplane and the application of the present invention thereto.
Figure 2:
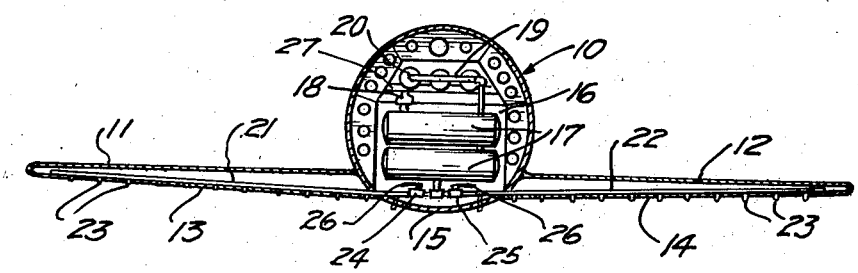
Figure 2 is a view in transverse section through the airplane as seen on the line 2—2 of Figure 1 and shows the fire extinguishing apparatus and the manner in which it is mounted in the plane.

Referring more particularly to the drawings, 10 indicates the fuselage of an airplane having wings 11 and 12. It is to be understood that various types of airplanes might be used for the present purpose but that it is believed more desirable to provide an airplane constructed so that the wings 11 and 12 will be positioned low on the sides of the fuselage, as shown in Fig. 2 of the drawings, so that the under faces 13 and 14 of the wings 10 and 11, respectively, will merge with the bottom surface 15 of the floor of the fuselage of the airplane. Mounted within a cargo compartment 16 which is built within the fuselage are supply tanks 17 within which a fire extinguishing agent is placed. It is to be understood that any desired number of these tanks may be used to receive the liquid or gaseous fire extinguishing agent, and that they are equipped with piping which makes it possible for them to be interconnected for use in series or for use separately.

The tanks are provided with suitable pressure regulators 18 and are connected by piping 19 with a source of compressed air or inert gas which is preferably contained in a series of tanks 20. It will be understood that by using multiple tanks 17 and 20 the tanks will be of convenient size so that they may be mounted within the airplane or removed therefrom. The tanks 17 are connected with distributor pipes 21 and 22 which extend outwardly within the wing sections 11 and 12 preferably adjacent to the trailing edges of the wings and close to the lower wing surfaces 13 and 14. These distributor pipes also extend across the lower surface 15 of the fuselage and are fitted with a plurality of downwardly directed discharge nozzles 23 to project jets of liquid downwardly across the slip stream of air passing along the under faces of the wings. These nozzles are equally spaced along the distributing pipes and in connection therewith and project downwardly through the lower wing surfaces 13 and 14 and the floor surface 15. It is to be understood that these nozzles may be of any desired construction so that they can be adjusted to discharge a suitable jet of fire extinguishing fluid either as a stream or spray. The distributor pipes 21 and 22 are fitted with control valves 24 and 25, respectively, by which the flow of liquid from the supply tanks 17 to the distributor pipes may be established or interrupted and otherwise controlled. These valves are preferably fitted with control members 26 leading to a convenient remote point in the airplane so that the valves may be opened and closed optionally by the pilot.

In operation of the present invention the cylinders 20 are suitably charged with a compressed air or inert gas and installed upon a supporting rack 27 within the body of the airplane. These tanks are then connected through piping 19 and may then be connected with previously filled supply tanks 17. The supply tanks 17 are filled with any liquid which has a tendency to retard combustion of burning material by wetting the material or interrupt its combustion by chemical action, either by using a liquid or a gas. It will be understood that since various liquids and gases having the above characteristics are commercially available they need not be separately specified herein. After the equipment is all installed within the airplane the airplane may be flown over the area of conflagration at which time the controls 26 will manipulate the valves 24 and 25 and allow the fluid to be discharged from the nozzles 23 in a downwardly direction under a desired pressure established by the pressure regulator 18 and under the impelling force of the compressed fluid within the tanks 20. The jets of liquid will be projected downwardly across the slip stream of air and will be dispersed so that a substantially continuous curtain of liquid will be produced to uniformly cover a wide burning area. It will be recognized that a large volume of fire extinguishing fluid may be carried at one time in tanks 17 suitably arranged within the airplane and that thus the fire extinguishing fluid may be directly applied to the burning material from above and in a manner to smother the flame and render it incombustible.

It will thus be seen that the method and means of controlling and extinguishing fires here disclosed is simple in construction, provides means whereby fire fighting material may be delivered directly to the burning area by airplane without the necessary retardation occurring when fire fighting equipment is drawn over the terrain, and that it also provides means whereby the area of conflagration may be observed in its entirety and operations carried on to more effectively and quickly extinguish the fire.

While I have shown the preferred method of performing the present invention and the preferred apparatus for practising said method, it is to be understood that variations might be made in the steps of procedure, and that changes may be made in the combination, construction and arrangement of parts of the apparatus by those skilled in the art without departing from the spirit of the invention as claimed.

Having thus described my invention, what I claim and desire to secure by Letters Patent is:

1. Fire fighting apparatus, comprising an airplane, distributing pipes incorporated within the wings and extending along the trailing edges thereof, a plurality of fluid discharge nozzles connecting with said distributing pipes and projecting downwardly below the bottom surfaces of said wings, and a source of fire extinguishing fluid carried by the airplane and with which said distributing pipes are connected, whereby said fluid may be released in a downwardly direction into the atmosphere along the wings as delivered from the source of supply and will be dispersed by the slip stream of air passing along the under faces of the wings.

2. Fire fighting apparatus, comprising an airplane, distributing pipes incorporated within the wings and extending substantially the length of and along the trailing edges thereof, a plurality of fluid discharge nozzles arranged along and connecting with said distributing pipes and extending downwardly through the bottom surfaces of said wings to project liquid jets downwardly into the slip stream of air passing beneath the wings, a source of fire extinguishing fluid carried by the airplane and with which said distributing pipes are connected, whereby said fluid may be released into the atmosphere along the wings as delivered from the source of supply, and means for imposing fluid pressure upon the fire extinguishing fluid whereby it will be discharged from the nozzles with force.

3. Fire fighting apparatus comprising an airplane having a fuselage and transversely extending wings, distributor pipes extending outwardly from the fuselage within and substantially throughout the length of the trailing edge portion of the wings, a series of nozzles carried by said distributing pipes and extending downwardly and outwardly through the lower wing covering and across the slip stream of air passing along the under faces of the wings, tanks mounted within the fuselage and communicating with said distributor pipes to deliver a supply of fire extinguishing fluid to said pipes and their nozzles, a source of air under pressure acting upon the fluid within said tanks to discharge the same, a pressure regulator on the tanks to establish a desired fluid pressure within the tanks, and shut-off valve means between the tanks and the distributing nozzles.

CHARLES B. HARP.

REFERENCES CITED

The following references are of record in the file of this patent:

UNITED STATES PATENTS

| Number | Name | Date |
|---|---|---|
| 1,264,390 | Hamilton | Apr. 30, 1918 |
| 1,997,669 | Arcieri | Apr. 16, 1935 |
| 1,580,301 | Johnson | Apr. 13, 1926 |
| 1,604,290 | King | Oct. 26, 1926 |
| 2,359,573 | MacKay | Oct. 3, 1944 |
| 1,673,087 | Morse | June 12, 1928 |
| 1,396,894 | Stevens | Nov. 15, 1921 |
| 1,779,617 | Pavola | Oct. 28, 1930 |
| 2,250,762 | Haberlin | July 29, 1941 |

FOREIGN PATENTS

| Number | Country | Date |
|---|---|---|
| 31,463 | France | Mar. 14, 1927 |